United States Patent
Young et al.

(10) Patent No.: US 7,841,152 B2
(45) Date of Patent: Nov. 30, 2010

(54) METHOD FOR MACHINING A STRUCTURAL MEMBER HAVING AN UNDULATING WEB

(75) Inventors: Keith A. Young, St. Peters, MO (US); Ryan L. Hanks, Bunker Hill, IL (US); Kevin G. Waymack, Hazelwood, MO (US); David P. Heck, St. Peters, MO (US); David R. Bolser, Florissant, MO (US)

(73) Assignee: The Boeing Company, Chicago, IL (US)

( * ) Notice: Subject to any disclaimer, the term of this patent is extended or adjusted under 35 U.S.C. 154(b) by 1405 days.

(21) Appl. No.: 11/165,829

(22) Filed: Jun. 23, 2005

(65) Prior Publication Data

US 2010/0043231 A1 Feb. 25, 2010

(51) Int. Cl.
 *E04D 15/00* (2006.01)
 *E04C 3/00* (2006.01)
(52) U.S. Cl. .................................. 52/749.1; 52/837
(58) Field of Classification Search ................ 52/729.1, 52/837, 749.1
 See application file for complete search history.

(56) References Cited

U.S. PATENT DOCUMENTS

| | | | |
|---|---|---|---|
| 4,848,137 A * | 7/1989 | Turner et al. ................. 73/1.81 |
| 4,945,488 A * | 7/1990 | Carver et al. ................. 700/182 |
| 5,023,800 A * | 6/1991 | Carver et al. ................. 700/182 |
| 5,033,014 A * | 7/1991 | Carver et al. .................... 703/1 |
| 5,081,407 A * | 1/1992 | Kono et al. ................. 318/571 |
| 5,239,479 A * | 8/1993 | Nolting et al. .............. 700/174 |
| 5,318,005 A * | 6/1994 | Mayer ...................... 125/13.01 |
| 5,688,426 A * | 11/1997 | Kirkwood et al. ........... 219/633 |
| 5,829,716 A * | 11/1998 | Kirkwood et al. ........ 244/117 R |
| 6,082,938 A * | 7/2000 | Fink ........................... 409/132 |
| 6,116,539 A * | 9/2000 | Williams et al. .............. 244/46 |
| 6,141,935 A | 11/2000 | Artner et al. |
| 6,282,862 B1 | 9/2001 | Weeks |
| 6,397,550 B1 | 6/2002 | Walker et al. |
| 6,481,175 B2 | 11/2002 | Potter et al. |
| 6,571,527 B1 | 6/2003 | Rattini |
| 6,938,391 B1 | 9/2005 | Patel |
| 2002/0197122 A1 * | 12/2002 | Mizutani et al. ............ 409/132 |
| 2005/0116105 A1 * | 6/2005 | Munk et al. ................. 244/123 |

\* cited by examiner

*Primary Examiner*—Richard E Chilcot, Jr.
*Assistant Examiner*—Mark R Wendell

(57) ABSTRACT

Machined structural members and methods for forming the same are disclosed. In one embodiment, a structural member includes a web portion that extends in a first direction that includes a non-planar portion, and a first flange portion coupled to the web portion that extends in the first direction. A second flange portion is coupled to the web portion that also extends in the first direction. The first flange portion and the second flange portion are spaced apart in a second direction that is approximately perpendicular to the first direction. The web portion and the first and second flange portions are integrally formed as a unitary, monoblock component.

6 Claims, 8 Drawing Sheets

METHOD FOR MACHINING A STRUCTURAL MEMBER HAVING AN UNDULATING WEB

GOVERNMENT LICENSE RIGHTS

This invention was made with Government support under contract number N00014-00-C-0544 awarded by the United States Navy. The government has certain rights in this invention.

FIELD OF THE INVENTION

This invention relates generally to structural components, and more particularly, to structural members formed by machining processes.

BACKGROUND OF THE INVENTION

Structural members are available in a wide variety of configurations to provide structural support under a variety of loading conditions. For example, the wing and empennage surfaces of an aircraft typically include parallel and span-wise oriented structural members called stringers that impart flexural stiffness to the wing and empennage surfaces. Typically, a structural member is fabricated from a metal, such as aluminum, steel or titanium, and is configured to resist flexural and/or shear loads. Accordingly, the structural member includes a web portion that is generally planar and oriented in a direction approximately parallel to the applied load so that the web portion offers resistance to a bending moment generated by the load. A flange portion may be positioned on one or both of the longitudinal edges of the web portion in order to provide resistance to localized failure of the web portion due to lateral buckling. The flange portion further allows the structural member to be incorporated into a structure by providing an attachment and/or supporting surface for other adjacent members comprising the structure.

Although the web portion may be planar, other configurations are possible. For example, in one known configuration, a structural member includes a web portion having a generally sinusoidal cross-sectional shape that is positioned between a pair of flanges. The sinusoidal cross-sectional shape is typically formed by moving a planar material through a suitable pair of forming rolls that are configured to impart a sinusoidal cross-sectional shape to the planar material. The web portion may then be cut to a desired length and joined to the flange portions by welding respective edges of the web portion to the flange portions.

One drawback associated with the foregoing structural member is that the welding process that joins the sinusoidal web portion to the flanges typically generates a relatively small fillet radius. Accordingly, structural members formed in this manner exhibit reduced bending and shear resistance due to the small fillet radius. In addition, residual stresses may be introduced into the structural member by the cold-forming process used to form the web portion, and through the welding process used to join the web portion to the flange portions. The residual stresses are typically relieved by subjecting the structural member to a thermal heat treatment process, which generally adds to the fabrication cost of the structural member.

Another possible drawback of the foregoing structural member is that it may be relatively difficult to form attachments, such as mounting brackets, for example, to the sinusoidal-shaped web portion. Although planar surfaces, such as doublers, may be attached to the web portion, the planar surfaces undesirably add weight to the structural member, and require additional forming and joining processes to implement, thus incurring additional fabrication costs. Further, it is often desirable to provide penetrations that extend through the web portion so that other hard ware such as plumbing, electrical wiring, control cables and the like may pass through the structural member. Such penetrations are typically difficult to form in the sinusoidal-shaped web portion. Therefore, structural members that at least partially mitigate these possible disadvantages would have utility.

SUMMARY

The present invention comprises a machined structural member and methods for forming the same. In one aspect, a structural member includes a web portion that extends in a first direction that includes a non-planar portion, and a first flange portion coupled to the web portion that extends in the first direction. A second flange portion is coupled to the web portion that also extends in the first direction. The first flange portion and the second flange portion are spaced apart in a second direction that is approximately perpendicular to the first direction.

BRIEF DESCRIPTION OF THE DRAWINGS

Embodiments of the present invention are described in detail below with reference to the following drawings.

DETAILED DESCRIPTION

The present invention relates to machined structural members and methods for forming such members. Many specific details of certain embodiments of the invention are set forth in the following description and in FIGS. 1 through 10 to provide a thorough understanding of such embodiments. One skilled in the art, however, will understand that the present invention may have additional embodiments, or that the present invention may be practiced without one or more of the details described in the following description. In particular, the term "machined" is understood to generally include a fabrication method that is adapted to generate a unitary structural member.

Figure 1:
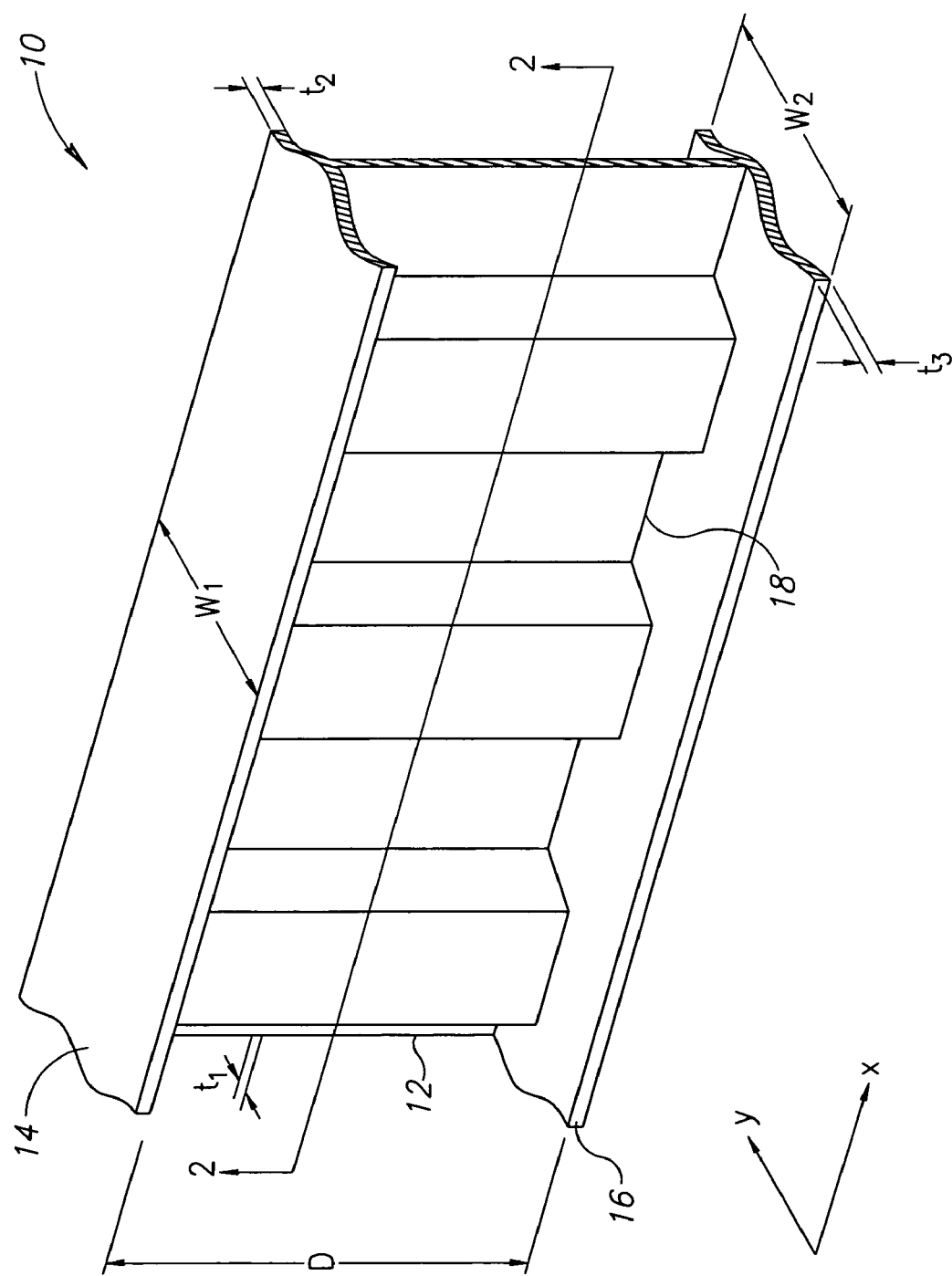
FIG. 1 is an exploded, partial isometric view of machined structural member according to an embodiment of the invention.

FIG. 1 is an exploded, partial isometric view of machined structural member 10 according to an embodiment of the invention. The machined structural member 10 includes a web portion 12 that is positioned between a first flange portion 14 and an opposing second flange portion 16. The web portion 12 may have a predetermined depth D in order to provide a desired resistance to flexural and shear stresses in response to an applied loading, and is also formed to have a generally undulating shape, as will be described in greater detail below. The web portion 12 may have a thickness $t_1$ that may be relatively constant as the structural member 10 extends in the x-direction, or it may vary continuously or non-continuously as the member 10 extends in the x-direction. The first flange portion 14 and the second flange portion 16 are generally planar members having predetermined widths $W_1$ and $W_2$, respectively. The web portion 12, the first flange portion 14 and the second flange portion 16 are generally formed as a unitary machined article from a rigid ferrous or non-ferrous material. In one particular embodiment, the structural member 10 is fabricated from an aluminum alloy, and the web-portion 12 is formed to have a plurality of undulations (or corrugations). Although the structural member 10 shown in FIG. 1 includes a web portion 12 having an approximately constant depth D, it is understood that the depth D may be variable either continuously or even non-continuously, as the member 10 extends in an x-direction. It is further understood that the width $W_1$ of the first flange portion 14 and the width $W_2$ of the second flange portion 16 may also vary in a continuous or a non-continuous manner as the member 10 extends in the x-direction. The first flange portion 14 and the second flange portion 16 may have respective thicknesses $t_2$ and $t_3$. The thicknesses $t_2$ and $t_3$ may be relatively constant as the member 10 extends in the x and y directions. Alternately, the thicknesses $t_2$ and $t_3$ may vary continuously or non-continuously as the member 10 extends in the x and y directions.

Still referring to FIG. 1, the machined structural member 10 includes a root portion 18 that is formed during the fabrication of the structural member 10 and along the member 10 where the flange portion 12 adjoins the first flange portion 14 and the second flange portion 16. The root portion 18 advantageously avoids a stress discontinuity as shear stresses are transferred from the web portion 12 to the first flange portion 14 and the second flange portion 16. The root portion 18 will be discussed in greater detail below.

Figure 2:
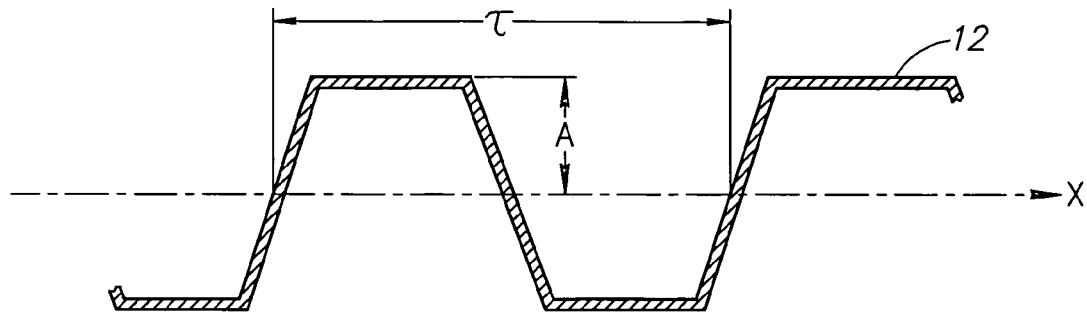
FIG. 2 is a partial cross sectional view of the web portion of FIG. 1 viewed along the cross sectional axis 2-2 shown in FIG. 1.

FIG. 2 is a partial cross sectional view of the web portion 12 viewed along the cross sectional axis 2-2 shown in FIG. 1. The web portion 12 has a generally piecewise continuous waveform shape having a period τ, and amplitude A. The period τ and the amplitude A may be approximately constant as the c structural member 10 of FIG. 1 extends in the x-direction, or at least one of the period τ and the amplitude A may vary either continuously or non-continuously as the member 10 extends in the x-direction. In another embodiment, the web portion 12 may be a compound waveform that includes a first piecewise continuous waveform, and a second piecewise continuous waveform superimposed on the first waveform.

Figure 3:
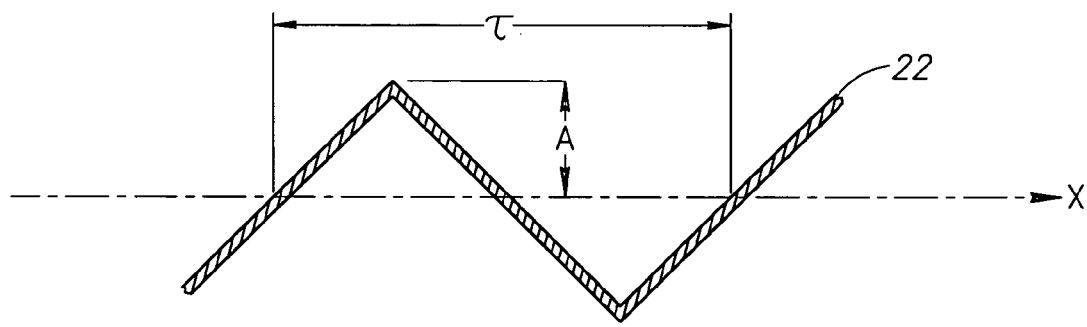
FIG. 3 is a partial cross sectional view of a web portion viewed along the cross section 2-2 shown in FIG. 1, according to another embodiment of the invention.

FIG. 3 is a partial cross sectional view of a web portion 22 viewed along the cross section 2-2 shown in FIG. 1, according to another embodiment of the invention. The web-portion 22 has a generally triangular-wave cross sectional shape, and has a period τ, and amplitude A. As in the previous embodiment, the period τ and the amplitude A may be approximately constant as the composite structural member 10 extends in the x-direction, or at least one of the period τ and the amplitude A may vary either continuously or non-continuously as the member 10 extends in the x-direction.

Figure 4:
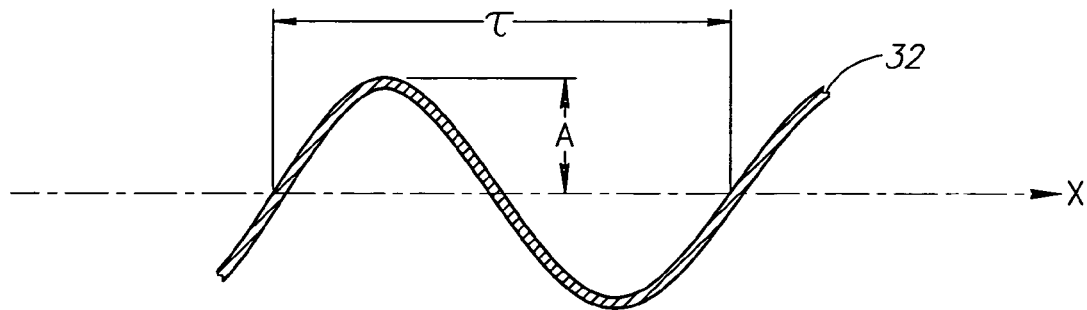
FIG. 4 is another partial cross sectional view of a web portion viewed along the cross section 2-2 shown in FIG. 1, according to still another embodiment of the invention.

FIG. 4 is another partial cross sectional view of a web portion 32 viewed along the cross section 2-2 shown in FIG. 1, according to still another embodiment of the invention. The web-portion 32 has a generally sinusoidal cross sectional shape having a period τ, and amplitude A. The period τ and the amplitude A may be approximately constant as the composite structural member 10 of FIG. 1 extends in the x-direction, or at least one of the period τ and the amplitude A may vary either continuously or non-continuously as the member 10 extends in the x-direction. Substantially flat (or planar) portions (not shown in FIG. 4) may also be incorporated into the web portion 32 to support the attachment of other structural members. In another particular embodiment, the web portion 32 may be a compound waveform. For example, a first sinusoidal waveform may include another generally sinusoidal second waveform superimposed on the first waveform. Although FIG. 2 through FIG. 4 shows regular periodic cross-sectional shapes for the web portion 14 of FIG. 1, it is understood that other cross sectional shapes are possible. For example, it is understood that other periodic cross sectional shapes may be generated by combining sine and cosine functions in a Fourier series expansion to generate a desired periodic function.

Figure 5:
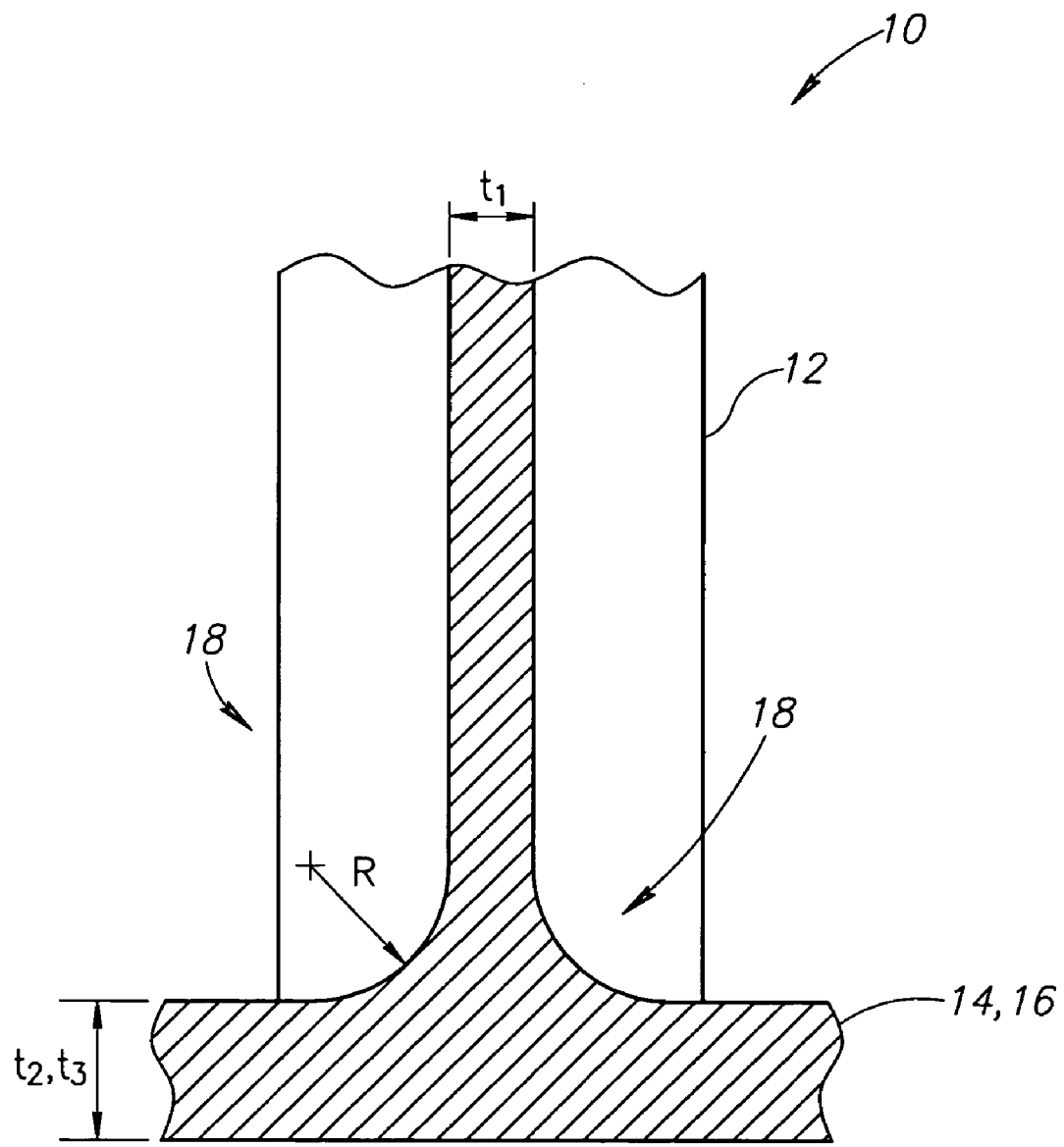
FIG. 5 is a partial cross-sectional view of a root portion of the machined structural member of FIG. 1.

FIG. 5 is a partial cross-sectional view of the machined structural member 10 of FIG. 1 that will now be used to describe the root portion 18 in greater detail. The root portion 18 is formed during the machining process that forms the web portion 12 and the first flange portion 14 and the second flange portion 16. In one specific embodiment, the root portion 18 may have a radius of curvature R that is relatively constant and is a selected fraction of the thickness $t_1$ of the web portion 12, or it may be a selected fraction of the thicknesses $t_2$ and $t_3$ of the first flange portion 14 and the second flange portion 16, respectively. It is understood that the selected fraction of the foregoing thicknesses $t_1$, $t_2$ and $t_3$ used to form the radius of curvature R may be a fraction that is less than one, or greater than one. In a specific embodiment, the radius of curvature R is approximately equal to a selected one of the thicknesses $t_1$, $t_2$ and $t_3$. In another specific embodiment, the root portion 18 may have a radius of curvature R that varies continuously in the root portion 18. For example, the radius of curvature R may vary so that the root portion 18 has a parabolic, or even an elliptical shape.

Figure 6:
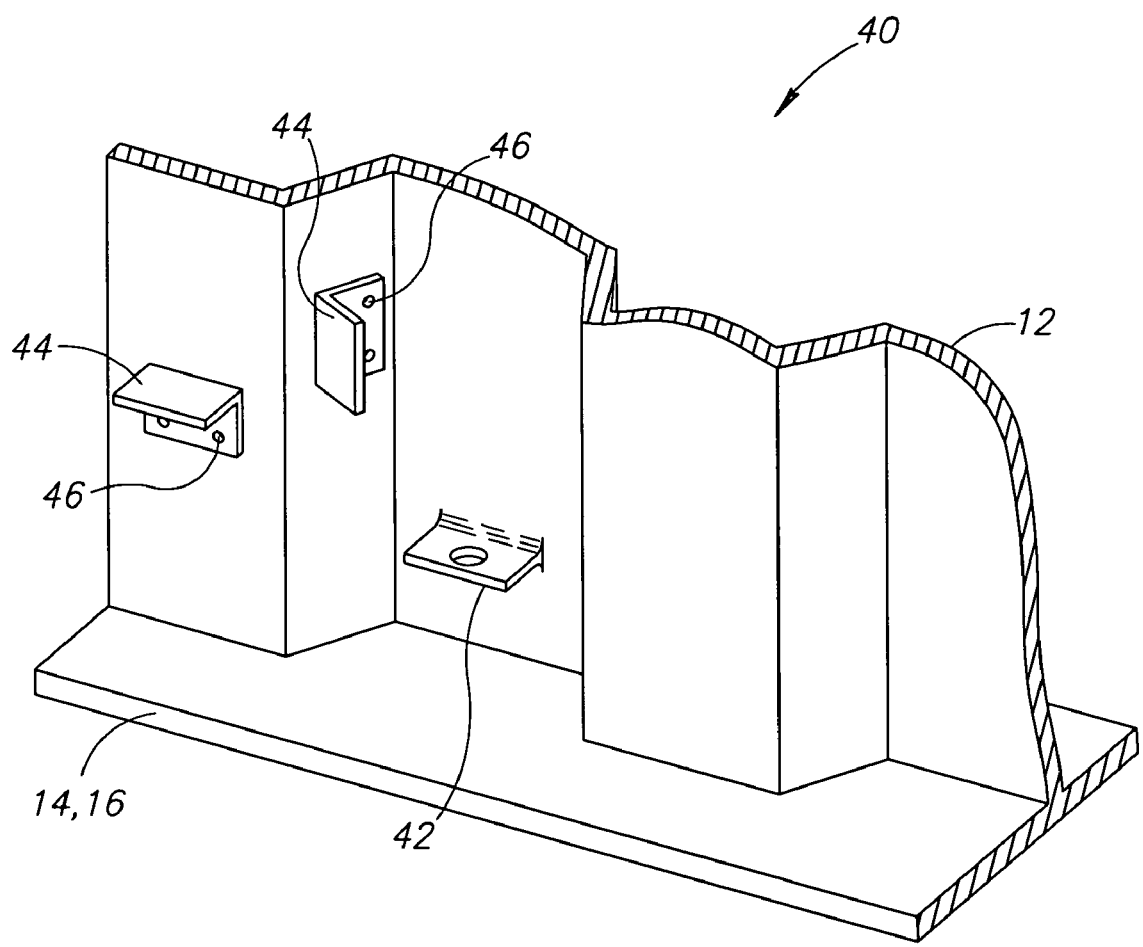
FIG. 6 is a partial cutaway and isometric view of a machined structural member according to still yet another embodiment of the invention.

FIG. 6 is a partial cutaway and isometric view of a machined structural member 40 according to still yet another embodiment of the invention. Various portions of the machined structural member 40 have been described in detail in connection with previous embodiments, and in the interest of brevity, will not be described further. The member 40 includes one or more attachment locations 42 that are integrally formed with the machined structural member 40. The attachment location 42 may be used to support other suitable hardware and to fixedly retain such hardware to the structural member 40. Although the attachment location 42 is shown integrally formed with the web portion 12 of the structural member 40, it is understood that the attachment location 42 may be formed as an integral portion of the first flange portion 14 and/or the second flange portion 16 (FIG. 1). The structural member 40 may also include one or more attachment brackets 44 that are separately formed and attached to the structural member 40 using apertures 46 that are formed during the fabrication of the member 40. The apertures 46 project into or through the member 40 and are suitably-sized to accept a fastener (not shown in FIG. 6). Accordingly, the apertures 46 may be drilled into the member 40 and tapped to accept threaded fasteners. Alternately, the apertures 46 may be suitably formed to accept rivets, or other known fastening devices.

Figure 7:
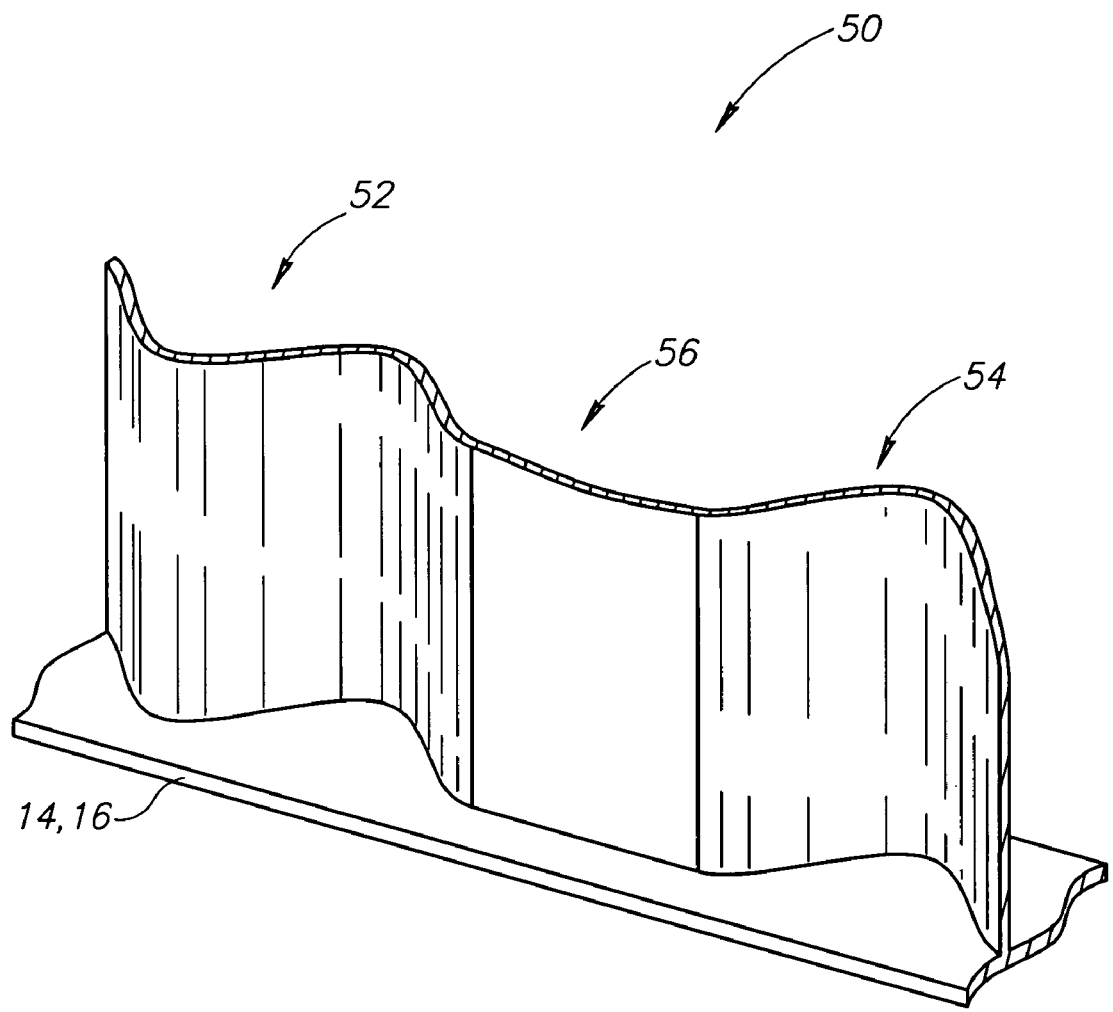
FIG. 7 is a partial cutaway and isometric view of a machined structural member according to yet another embodiment of the invention.

FIG. 7 is a partial cutaway and isometric view of a machined structural member 50 according to yet another embodiment of the invention. Again, various portions of the machined structural member 50 have been described in detail in connection with other embodiments, and thus need not be described further. The member 50 includes a first web portion 52 and a second web portion 54. The first web portion 52 and the second web portion 54 have a generally undulating (or corrugated) cross sectional configuration, as shown in detail in FIGS. 2 through 4. A relatively planar third web portion 56 is interposed between the first web portion 52 and the second web portion 54. The web portion 56 may further include attachment penetrations that may be used to fixably attach other hardware components to the third web portion 56. Alternately, the third web portion 56 may be configured to permit other structural members to be fixably coupled to the machined structural member 50.

Figure 8:
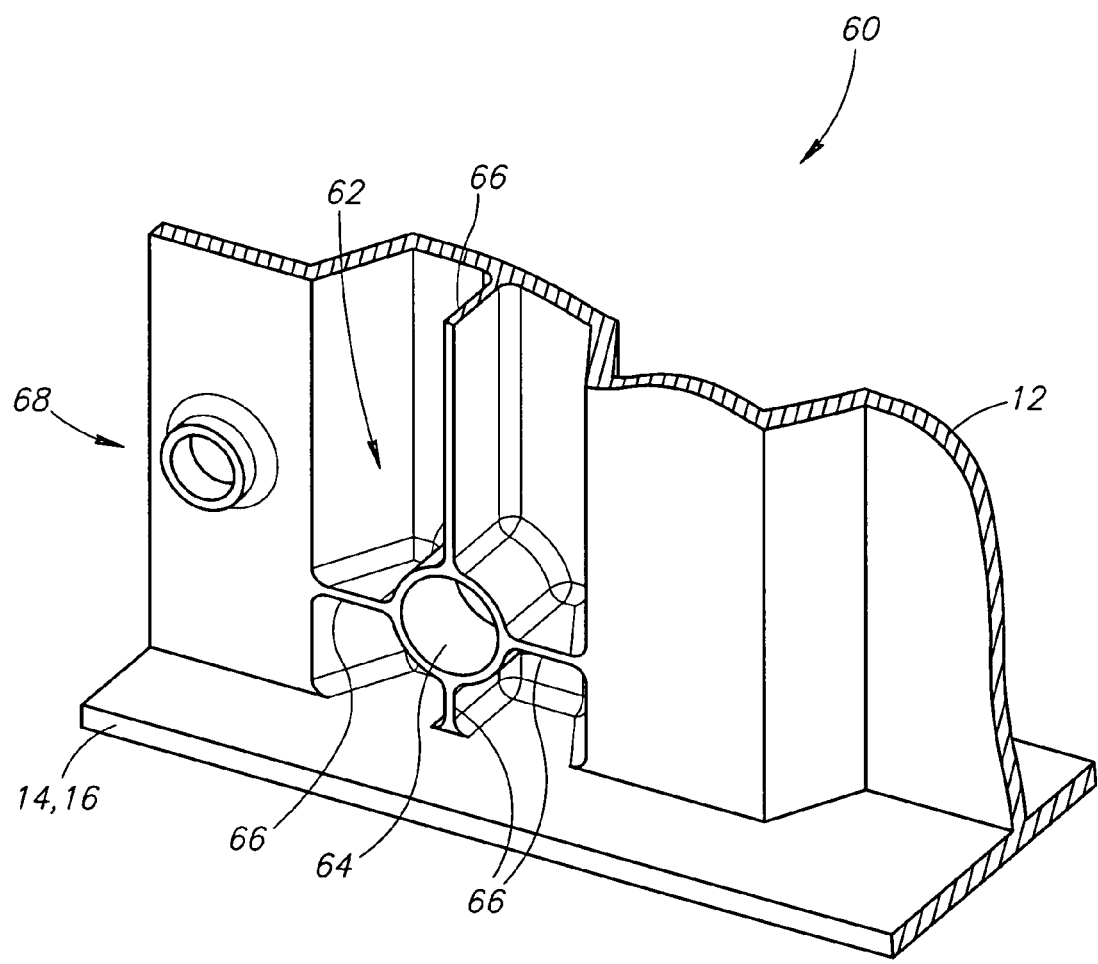
FIG. 8 is a partial cutaway and isometric view of a machined structural member according to another embodiment of the invention.

FIG. 8 is a partial cutaway and isometric view of a machined structural member 60 according to another embodiment of the invention. In this embodiment, the member 60 includes a first penetration 62 that is integrally formed with the member 60. The first penetration 62 further includes a bore 64 of predetermined shape and size that extends through the web portion 12 of the member 60. The first penetration 62 may also include one or more reinforcing ribs 66 that extend outwardly from the bore 64 and intersect selected portions of the first flange portion 14, the second flange portion 16, and the web portion 12. The structural member 60 may include a second penetration 68 that is also integrally formed in the web portion 12 and extends through a selected portion of the web-portion 12. The first penetration 52 and the second penetration 68 may be used to allow plumbing, electrical wiring, control cables and other similar devices to pass through the machined structural member 60.

Figure 9:
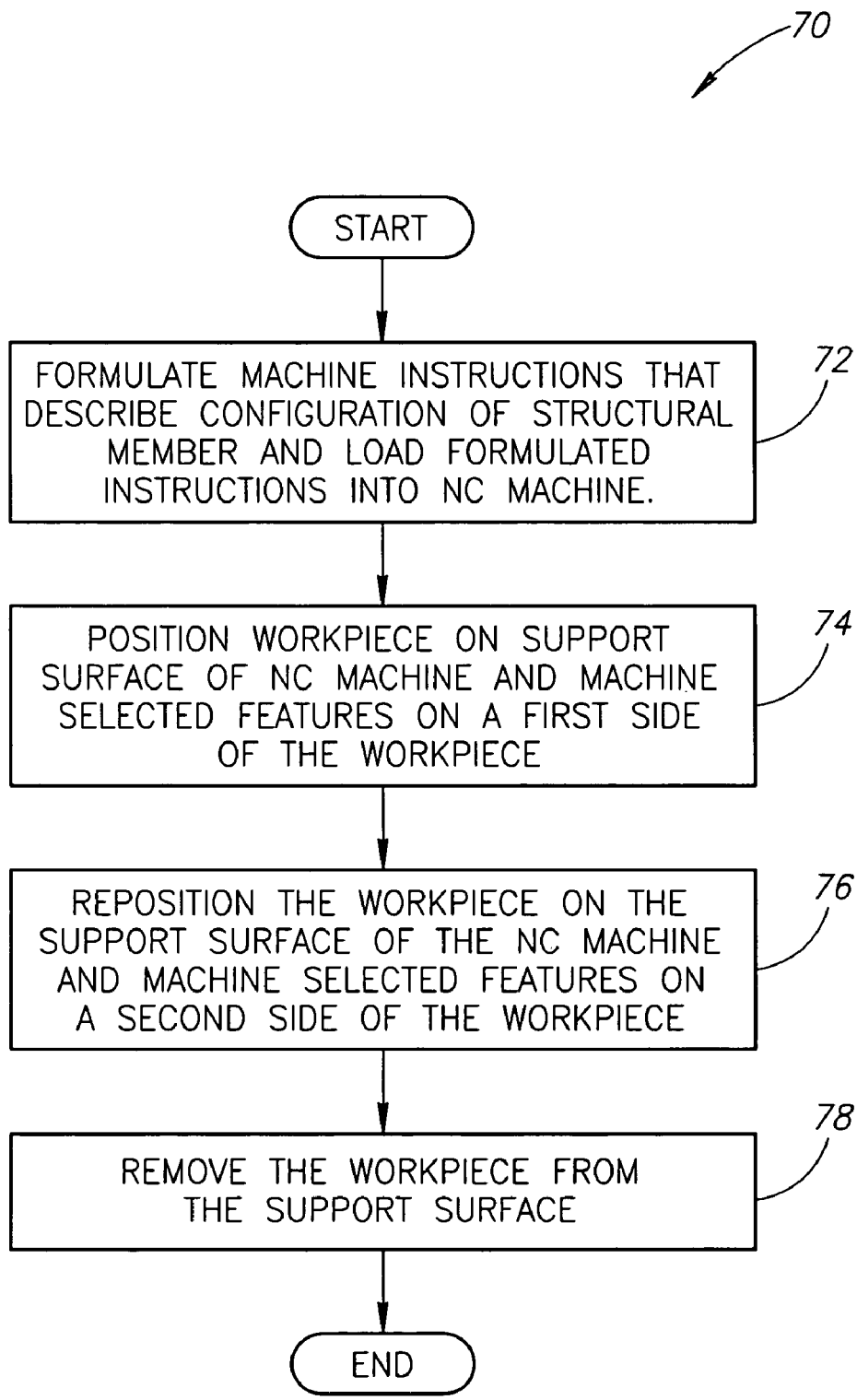
FIG. 9 is a flowchart that will be used to describe a method of forming a machined structural member, according to another embodiment of the invention.

FIG. 9 is a flowchart showing a method 70 of forming a machined structural member, according to another embodiment of the invention. At block 72, machine instructions are formulated that describe the geometrical configuration of the structural member. Accordingly, the instructions may originate in a digital representation of the structural member that may be generated by a suitable Computer Aided Design (CAD) system. In a particular embodiment, for example, the digital representation is generated by the Computer Aided Three Dimensional Interactive Application (CATIA), available from Daussault Systemes of Suresnes, France, although other suitable alternatives exist. The digital representation may then be communicated to a numerically-controlled (NC) machine center that translates the digital representation into a suitable set of machine instructions. One suitable NC machine center is a multi-axis CNC machine tool installation having a "five-axis" capability, so that machine tool installation that is operable to move the spindle mechanism along three translational directions and about two rotational axes. An example of a five-axis CNC machine tool installation is the T-30 CNC machining center, available from Cincinnati Milacron, Inc. of Cincinnati, Ohio, although other suitable alternatives exist.

At block 74, a work piece is positioned on a suitable supporting structure in the NC machine center and selected features are machined on a first side of the work piece. The work piece includes a unitary monoblock of a selected material, and may include a solid billet of material of suitable size that is positioned on the supporting structure, or it may include a billet that has been processed to include one or more of the general geometrical details of the structural member. For example, the work piece may include a forging that has the general geometrical dimensions of the member, and must be subjected to machining processes in order to acquire the desired size and shape as described in the digital representation. While the selected features are machined on the first side, various fiducial features may be machined on the work piece in order to control dimensional variations that may arise during the machining process, as disclosed in detail in U.S. patent application Ser. No. 11/112,486, entitled "Methods for Controlling Dimensional Variations in Workpieces Subjected to Machining Operations", which application is incorporated by reference herein. U.S. Ser. No. 11/112,486 issued as U.S. Pat. No. 7,158,852 on Jan. 2, 2007.

At block 76, the workpiece is repositioned on the support structure of the NC machine center. If fiducial marks are applied to the structure, the marks are probed by a suitable machine probing system to determine a location of the workpiece on the support surface. Selected features on a second side of the member may then be machined. At block 78, the work piece is removed from the NC machine center, and may be subjected to additional surface treatments such as deburring, anodization, painting or other similar processes.

Figure 10:
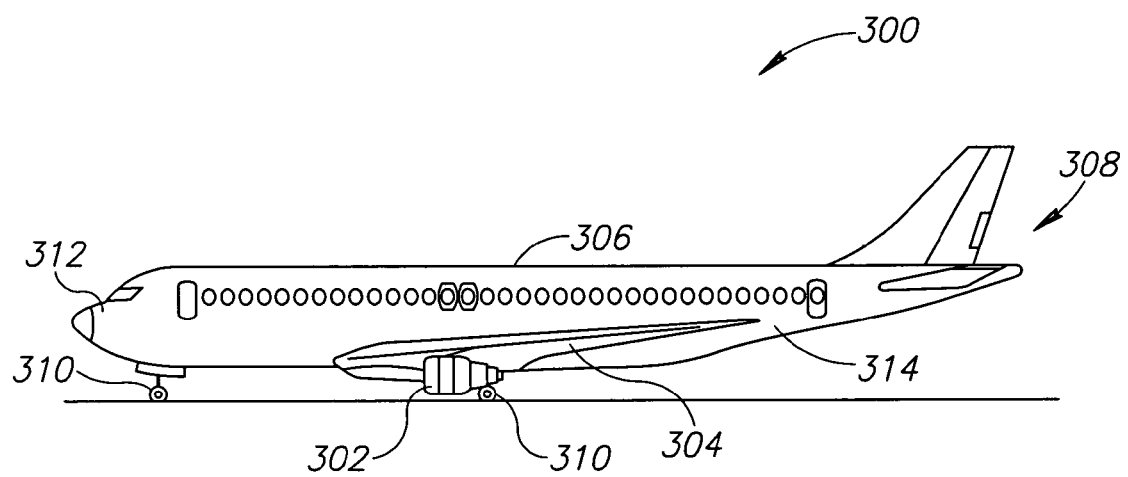
FIG. 10 is a side elevation view of an aircraft having one or more of the disclosed embodiments of the present invention.

Those skilled in the art will also readily recognize that the foregoing embodiments may be incorporated into a wide variety of different systems and structures. Referring now in particular to FIG. 10, a side elevation view of an aircraft 300 having one or more of the disclosed embodiments of the present invention is shown. The aircraft 300 generally includes a variety of components and subsystems known in the pertinent art. For example, the aircraft 300 generally includes one or more propulsion units 302 that are coupled to wing assemblies 304, or alternately, to a fuselage 306 or even other portions of the aircraft 300. Additionally, the aircraft 300 also includes a tail assembly 308 and a landing assembly 310 coupled to the fuselage 306, and a flight control system 312 (not shown in FIG. 10), as well as a plurality of other electrical, mechanical and electromechanical systems that cooperatively perform a variety of tasks necessary for the operation of the aircraft 300, and which in the interest of brevity, will not be described in detail.

With reference still to FIG. 10, the aircraft 300 may include one or more of the embodiments of the machined structural member 314 according to the present invention, which may be incorporated into various structural portions of the aircraft 300. For example, the various disclosed embodiments may be used to form stringers in the wing assemblies 304 and/or surfaces in the tail assembly 308, or may be used to form floor beams (not shown in FIG. 10) positioned within the fuselage 306.

The aircraft 300 is generally representative of a commercial passenger aircraft, which may include, for example, the 737, 747, 757, 767 and 777 commercial passenger aircraft available from The Boeing Company of Chicago, Ill. In alternate embodiments, however, the present invention may also be incorporated into flight vehicles of other types. Examples of such flight vehicles include manned or unmanned military aircraft, rotary wing aircraft, and even ballistic flight vehicles, as illustrated more fully in various descriptive volumes, such as Jane's All The World's Aircraft, available from Jane's Information Group, Ltd. of Coulsdon, Surrey, UK.

While preferred and alternate embodiments of the invention have been illustrated and described, as noted above, many changes can be made without departing from the spirit and scope of the invention. Accordingly, the scope of the invention is not limited by the disclosure of these preferred and alternate embodiments. Instead, the invention should be determined entirely by reference to the claims that follow.

What is claimed is:

1. A method for machining a structural member having an undulating web portion, comprising:

forming at least one fiducial mark on a first side of a billet and using a numerically controlled (NC) machine installation to machine structural member features in the first side of the billet, the features including a first side of the undulating web portion; and using the at least one fiducial mark as a reference to machine structural member features in an opposite side of the billet, the features including a second side of the undulating web portion.

2. The method of claim 1, further comprising formulating a geometrical description of the structural member including a description of the undulating web portion of the member.

3. The method of claim 2, wherein the web portion includes at least one of a periodic undulation portion and a non-periodic undulation portion.

4. The method of claim 2, wherein the web portion includes at least one of an approximately sinusoidal undulation, a triangular wave undulation and a square wave undulation.

5. The method of claim 1, further comprising forming at least one second fiducial mark on the opposite side of the billet, determining relative position of the first and second fiducial marks, and using that relative position to machine the features in the opposite side of the billet.

6. The method of claim 1, wherein the structural member features further include web-to-cap fillets at roots of the web portions.

* * * * *